United States Patent [19]
Semba

[11] Patent Number: 5,317,550
[45] Date of Patent: May 31, 1994

[54] APPARATUS AND METHOD FOR TRACK ACCESS

[75] Inventor: Tetsuo Semba, Zama, Japan

[73] Assignee: International Business Machines Corporation, Armonk, N.Y.

[21] Appl. No.: 7,875

[22] Filed: Jan. 22, 1993

[30] Foreign Application Priority Data

Apr. 28, 1992 [JP] Japan .................................. 4-109985

[51] Int. Cl.$^5$ .............................................. G11B 7/00
[52] U.S. Cl. .................................... 369/32; 369/44.28
[58] Field of Search ................. 369/32, 44.28, 44.27, 369/44.29, 44.31, 44.35; 360/78.01, 78.04, 78.05, 78.06, 77.08

[56] References Cited
U.S. PATENT DOCUMENTS 5,090,001 2/1992 Ito et al. ................................ 369/32
5,090,002 2/1992 Chow et al. ........................... 369/32

Primary Examiner—Paul Gensler
Assistant Examiner—Tan Dinh
Attorney, Agent, or Firm—D. A. Shifrin

[57] ABSTRACT

A track access apparatus is provided by the present invention in which a reference drive signal 90 proportional to the reference acceleration of a beam spot 22 is generated according to the contents of a track counter 34. A signal 92 indicating the reference velocity of the beam spot 22 is generated by an integrator 40 in accordance with reference drive signal 90. A signal 82 indicating the position of an objective lens 20 relative to a coarse actuator 26, a signal 84 indicating a relative velocity, and a signal 94 indicating the difference between the actual velocity of beam spot 22 and a reference velocity are supplied to coarse actuator 26 and to a fine actuator 28. Reference drive signal 90 is supplied to coarse actuator 26. The present invention makes maximum use of the rapid acceleration and deceleration capability of the coarse actuator and moves the beam spot to a target track accurately at high speed. The present invention also controls the velocity of the beam spot relative to an optical recording medium by using a simple hardware structure.

9 Claims, 4 Drawing Sheets

APPARATUS AND METHOD FOR TRACK ACCESS

FIELD OF THE INVENTION

The present invention is related to an apparatus for writing or reading information onto or from a track of an optical recording medium, such as an optical disk, and more particularly to an apparatus and a method for moving a beam spot from one track to another target track in order to write or read information (hereafter referred to as track access). In this specification, the concept of writing includes erasing, and the concept of an optical recording medium includes a magneto-optical recording medium.

BACKGROUND OF THE INVENTION

On an optical disk, tracks for writing information are arranged in a concentric circular form or in a spiral form on the recording surface. When information is to be written to or read from such an optical disk, a beam focused by an objective lens is radiated onto the disk in spot form and the desired tracks are traced. Since an objective lens and its support are heavy, a two-stage configuration is employed to enable the actuator to move a beam spot at high speed. A coarse actuator moves an objective lens and thus a beam spot roughly, while a fine actuator controls the position of the beam spot on the recording medium precisely. Conventional track access techniques are explained below with reference to pertinent documents.

PUPA No. 62-51037 discloses a technique for moving a beam spot mainly by means of a fine actuator. That is, a fine actuator is first driven so that the velocity of the beam spot relative to a disk matches a reference velocity. Then, a coarse actuator is driven by a signal indicating the displacement of the beam spot that is caused by the fine actuator, and this displacement is compensated for. Since the driving of the coarse actuator is delayed, it is difficult to make maximum use of its acceleration and deceleration capability. Moreover, at the time of acceleration and deceleration, the beam spot is displaced. Since the amount of displacement is proportional to the acceleration and deceleration, the beam spot is widely displaced when the acceleration or deceleration is great. The impossibility of obtaining reliable tracking error signals (hereafter referred to as TES) causes problems. Furthermore, because of this large displacement, there is a problem in that a large transient shock is transmitted from the coarse actuator to the fine actuator and the beam spot leaves the desired track when an attempt is made to hold the position of the beam spot in the center of tracks in order to write or read information after track access.

PUPA No. 1-290176 discloses a technique for transmitting to a coarse actuator a signal representing the difference between the drive signal (reference velocity signal) and the travel velocity signal of a beam spot, and for transmitting a high-frequency component of the signal to a fine actuator. In general, a coarse actuator cannot respond quickly, because its moving parts are heavier than those of a fine actuator. Therefore, the unit is designed to supply a quick response component to a fine actuator so that an objective lens can move over a disk surface correctly. However, this technique has problems in that the beam does not pass through the center of the objective lens when the objective lens slides slowly due to the movement of the coarse actuator, especially since, for an axial rotating-type fine actuator, it is difficult to manufacture an optical head so that the rotation shaft strictly matches the center of gravity of the fine actuator. Therefore, in reality, an objective lens driven by a fine actuator is accelerated proportionally to the acceleration of the coarse actuator. As a result, it slides slowly. However, this kind of movement cannot be compensated for by the high-frequency component of the above difference signal. If the objective lens is not positioned at the center of the beam by means of a spring when the fine actuator is not being driven, the beam cannot be controlled so that it passes through the center of the objective lens unless a direct current component is added to the difference signal.

In the conventional technology, when the velocity of a beam spot relative to an optical disk is to be controlled, a reference velocity generally recorded in ROM is read out according to the distance (number of tracks) from the current position of the beam spot to a target track. The reference velocity can be determined precisely according to the number of tracks, so that the velocity will be zero at the beginning and end of track access, and greatest in the middle. However, increasing the ROM capacity is problematic because a large amount of information must be stored in ROM. Neither of the aforementioned references shows an effective solution to this problem.

SUMMARY OF THE INVENTION

Therefore, one object of this invention is to overcome the above-mentioned problems in the prior art and to move a beam spot to a target track accurately at high speed, utilizing the acceleration and deceleration capability of a coarse actuator, in an apparatus for writing or reading information onto or from tracks on an optical recording medium.

Another object of this invention is to control the velocity of a beam spot relative to an optical recording medium with a simple hardware configuration.

To achieve these and other objects, the track access apparatus of the present invention comprises a coarse actuator for moving an objective lens over a plurality of tracks of an optical recording medium; a fine actuator, carried by the coarse actuator, for moving the objective lens relative to the coarse actuator in a tracking direction; means for calculating the distance from the current beam spot position to a target track; means for generating a relative position signal indicating the displacement of the objective lens relative to the coarse actuator and a relative velocity signal indicating the velocity of the objective lens relative to the coarse actuator; means for generating a velocity signal indicating the velocity of the beam spot relative to the optical recording medium; means for generating a reference drive signal by using the calculated distance, the reference drive signal being proportional to the reference acceleration of the beam spot relative to the optical recording medium; means for generating a reference velocity signal of the beam spot relative to the optical recording medium by using the reference drive signal; and means for generating a velocity difference signal indicating the difference between the reference velocity and the beam spot velocity. The coarse actuator is driven in accordance with the relative position and velocity signals of the objective lens, the velocity difference signal, and the reference drive signal, and the fine actuator is driven in accordance with the relative position and relative velocity signals of the objective lens and the velocity difference signal.

In the present invention, when a beam spot starts moving toward a target track, a reference drive signal is first fed forward and a coarse actuator is accelerated. A quick response in terms of acceleration is therefore obtained and fast access is realized. Since the velocity difference signal indicating the difference between the reference velocity and the beam spot velocity is applied to both the coarse actuator and the fine actuator, the two actuators simultaneously contribute to controlling the beam spot velocity. For example, when a difference signal contains a high-frequency component, the coarse actuator does not respond, but the fine actuator does. Therefore, the velocity control will respond quickly overall.

In addition, since the relative position signal and the relative velocity signal of the objective lens are applied to both the coarse actuator and the fine actuator, the two actuators simultaneously contribute to the stabilization of the position of the objective lens. For example, even when a fine actuator is accelerated by the movement of a coarse actuator, the position of the objective lens is stabilized by the movement of the fine actuator. Even when a beam spot is displaced from the center of the objective lens because the fine actuator attempts to follow the reference velocity, the coarse actuator moves so as to compensate for its displacement. Therefore, the position of the objective lens can be stabilized. Since acceleration becomes large during fast access, the vibration of the objective lens also becomes large. Although such vibration could previously have led to a loss of control at the end of access, the present invention can end the access movement securely on a target track by stabilizing the position of the objective lens.

In addition, the reference drive signal of a beam spot is generated according to the number of remaining tracks to a target track, and then a reference velocity signal is generated from the reference drive signal. This makes the hardware configuration simpler than when a reference velocity signal is generated directly from the number of remaining tracks.

The foregoing and other objects, features and advantages of the invention will be apparent from the following more particular description of the preferred embodiment of the invention, as illustrated in the accompanying drawings.

DETAILED DESCRIPTION

Embodiments of the present invention are explained with reference to the drawings.

Figure 1:
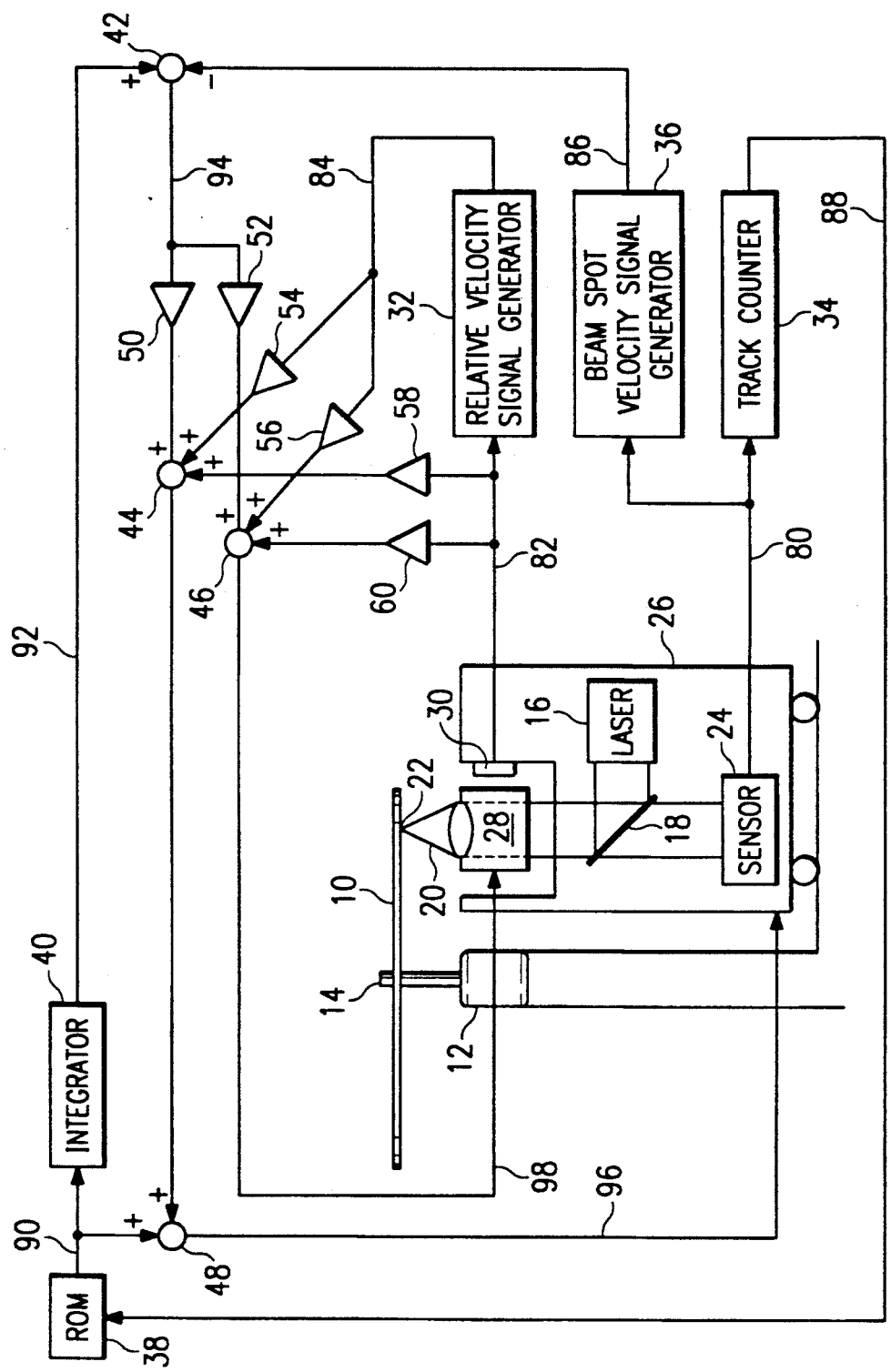
FIG. 1 is a block diagram showing a first embodiment of the present invention.

FIG. 1 schematically illustrates a first embodiment, in which the present invention is applied to an optical disk drive fitted with a piggy-back two-stage actuator consisting of a fine actuator carried by a coarse actuator. In this embodiment, the optical recording medium is an optical disk 10 rotated by a motor 12 at 1,800 r.p.m., for example. Optical disk 10 is attached to motor 12 through a motor shaft 14.

A laser beam that is outputted from a laser beam source 16 is reflected by a half-mirror 18, directed onto the recording surface of optical disk 10, focused by an objective lens 20, and radiated as a beam spot 22 with a diameter of about 1 micron. The beam that is reflected by the recording surface of optical disk 10 passes lens 20 and half mirror 18 and finally enters sensor 24 to generate a tracking error signal (TES) 80. TES is a sine wave signal whose period is the time required for a beam spot to cross one track. Well-known technologies, such as the push-pull method or the heterodyne method, can be used to generate TES 80.

Objective lens 20 is moved in the tracking direction of optical disk 10, that is, the radial direction, by a coarse actuator 26 and a fine actuator 28 mounted on it. Laser-beam source 16 and half mirror 18 are also carried by coarse actuator 26. Coarse actuator 26 is typically a linear motor. The mechanism of fine actuator 28 may be a well-known device, such as a spring support or a two-dimensional rotary lens actuator. Since examples of these actuators 26 and 28 are disclosed in PUPA No. 1-290176, detailed descriptions are not given here.

The displacement of objectives lens 20 relative to coarse actuator 26 is detected by a lens position sensor 30. One type of lens position sensor 30 optically detects the displacement of objective lens 20 relative to coarse actuator 26 by using a reflective-type photo interrupter, converting it into an electrical signal 82, and outputting it.

In FIG. 1, signal 82 outputted by lens position sensor 30 is used unchanged as the relative position signal of the objective lens. Signal 82 is sent to a relative velocity signal generator 32, where another signal 84, indicating the velocity of objective lens 20 relative to coarse actuator 26, is generated. One example of the relative velocity signal generator 32 is a differentiator.

Alternatively, a state-estimating device such as the one described in the second edition of "Digital Control of Dynamic Systems" (Gene F. Franklin, J. David Powell, and Michael L. Workman [Addision Wesley Co., 1990], 444–458) can be used. In that case, the estimated relative position and the estimated relative velocity of the objective lens are generated from output signal 82 from lens position sensor 30 and the input signal for fine actuator 28. The effect of the present invention can also be obtained by feeding back these output signals of the state-estimating device to actuators 26 and 28.

Alternatively, for example, as shown in "The Fundamentals of Automatic Control", ([Morikita Publishing, 1978] 148–174), a phase compensation technique may be used in order to generate, directly from output signal 82 of lens sensor 30, the sum of the appropriately weighed relative velocity and position.

With reference to FIG. 1 again, TES 80 is supplied to track counter 34. When track access is started, track counter 34 is set in advance by a microcomputer (not shown in the figure) to the total number of tracks to be crossed. As is well known in the art, track counter 34 detects the zero-level crossing of the input TES 80 and decreases the number of remaining tracks by one each time the beam spot crosses one track. In this way, the distance from the current position of the beam spot to a target track is calculated by the number of remaining tracks.

Alternatively, for an optical disk carrying out a sample servo, if a track identifier is recorded in each track, track counter 34 can be formed so that the number of remaining tracks is calculated from the identifiers of the current track and the target track, and the calculation result is retained. In this case, it is not necessary to supply TES 80 to track counter 34.

With reference to FIG. 1 again, TES 80 is also supplied to a beam spot velocity signal generator 36, where a signal 86 indicating the travel velocity of beam spot 22 relative to optical disk 10 is generated. Since beam spot velocity signal generation mechanisms are disclosed in many documents, such as PUPA No. 1-290176, PUPA No. 1-105335, and PUPA No. 1-134768, no explanation of them is included here.

The contents of track counter 34 are read at appropriate sampling intervals and its output signal 88 is supplied to ROM 38. ROM 38 outputs a reference drive signal 90 set to be proportional to the reference acceleration velocity of beam spot 22 relative to optical disk 10, which is stored at an address designated by the number of tracks. Constant and maximum acceleration and deceleration is desirable when access is made at high speed. Therefore, from the currently following track at the starting time of a track access, that is, from the starting track to the midpoint between the starting track and the target track, the reference acceleration is given a constant value, and from there to the target track it is in general given a constant value with a negative sign. Because ROM 38 generates a signal 90 proportional to this reference acceleration, a large capacity ROM is not required.

Alternatively, a reference drive signal generator may be composed of a register that retains the distance (the number of tracks) between the starting track and the midpoint between the starting and the target tracks, which is calculated at the start of track access, a comparator that compares the content of the register and that of track counter 34 and a circuit that generates a signal indicating either the first numerical value or the second numerical value, whose sign is different from that of the first value. In this case, ROM 38 is not used to generate a reference velocity.

Reference drive signal 90 is supplied to an integrator 40 and converted into a signal 92 indicating the reference velocity of beam spot 22 relative to optical disk 10. The integrator 40 is designed so that the relationship between the input and the output is equal to that between the drive signal of actual coarse actuator 26 and the travel velocity of the beam spot. That is, integrator 40 is a model that simulates coarse actuator 26. It is intended that integrator 40 performs integration with its pole at zero frequency. When losses are taken into consideration, incomplete integration such as that expressed by the transfer function $1/(1+s)$ may be executed.

The influence of gravity, which arises if coarse actuator 26 is a linear motor and gravity is applied as a large disturbance in one direction by tilting the whole disk drive, can be eliminated by changing the gain of integrator 40 according to the direction of track access.

In this way, according to the embodiment, the capacity of ROM 38 can be made smaller than the ROM retaining the reference velocity in conventional technology because a numerical value proportional to the reference acceleration is stored in ROM 38 and generation of a complex reference velocity is entrusted to integrator 40.

Reference velocity signal 92 is supplied to a subtractor 42 that generates a difference signal by comparing it to beam spot velocity signal 86. A velocity difference signal 94 outputted from subtractor 42 is sent to an adder 44 after it has been amplified by amplifier 50, and is there added to relative position signal 82 and relative velocity signal 84, which have been amplified by amplifiers 58 and 54, respectively. The output signal of adder 44 is supplied to another adder 48 and is there added to reference drive signal 90. The output signal 96 of adder 48 is supplied to coarse actuator 26 as its drive signal. The output signal 94 of subtractor 42 is sent to adder 46 after it has been amplified by amplifier 52, and is then added to relative position signal 82 and relative velocity signal 84, which have been amplified by amplifiers 60 and 56, respectively. The output signal 98 of adder 46 is supplied to fine actuator 28 as its drive signal. The gains of the amplifiers from 50 to 60 can be set to suit the performance of the implemented control system.

With the above-mentioned configuration, when beam spot 22 starts moving toward the target track, a rapid acceleration is achieved at the outset and high-speed access is realized because reference drive signal 90 is first fed forward and coarse actuator 26 is accelerated. Since signal 94, which is obtained by comparing reference velocity signal 92 and beam spot velocity 86, is then applied to both coarse actuator 26 and fine actuator 28, the two actuators simultaneously contribute to the velocity control of beam spot 22. In addition, since relative position signal 82 and relative velocity signal 84 of objective lens 20 are applied to both coarse actuator 26 and fine actuator 28, the two actuators simultaneously contribute to stabilization of the position of objective lens 20. Therefore, the embodiment can make maximum use of the acceleration and deceleration capability of coarse actuator 26, thus enabling beam spot 22 to reach the target track quickly and accurately.

Figure 2:
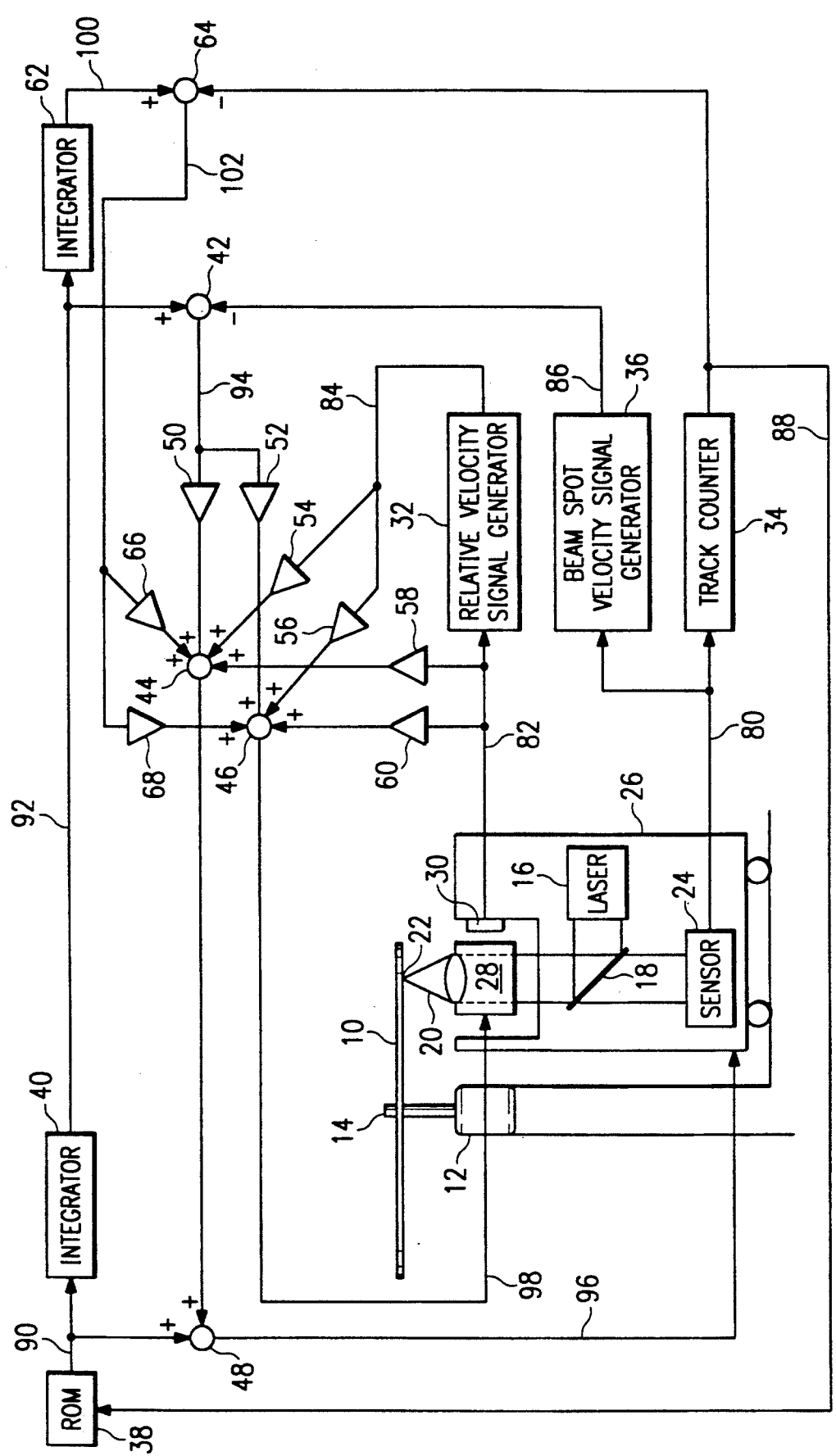
FIG. 2 is a block diagram showing a second embodiment of the present invention.

Next, a second embodiment of the present invention is explained with reference to FIG. 2. The second embodiment implements a further stabilized control system by adding the following factors to the first embodiment. Reference velocity signal 92 is converted by an integrator 62 into a signal 100, indicating the remaining distance to the target track. More specifically, integrator 62 retains the total number of tracks to be crossed as an initial value and integrates reference velocity signal 92, whose sign is reversed. Signal 100 is sent to subtractor 64, where a difference signal comparing it to output signal 88 from track counter 34 is generated. A distance difference signal 102 outputted from subtractor 42 is sent to adders 44 and 46 after it has been amplified by amplifiers 66 and 68, respectively, and is then added to drive signals 96 and 98 of actuators 26 and 28. Therefore, because both the travel velocity of a beam spot and the travel distance are controlled, further stabilized control is made possible. The gains of amplifiers 66 and 68 can be set to suit the performances of the implemented control system.

Figure 3:
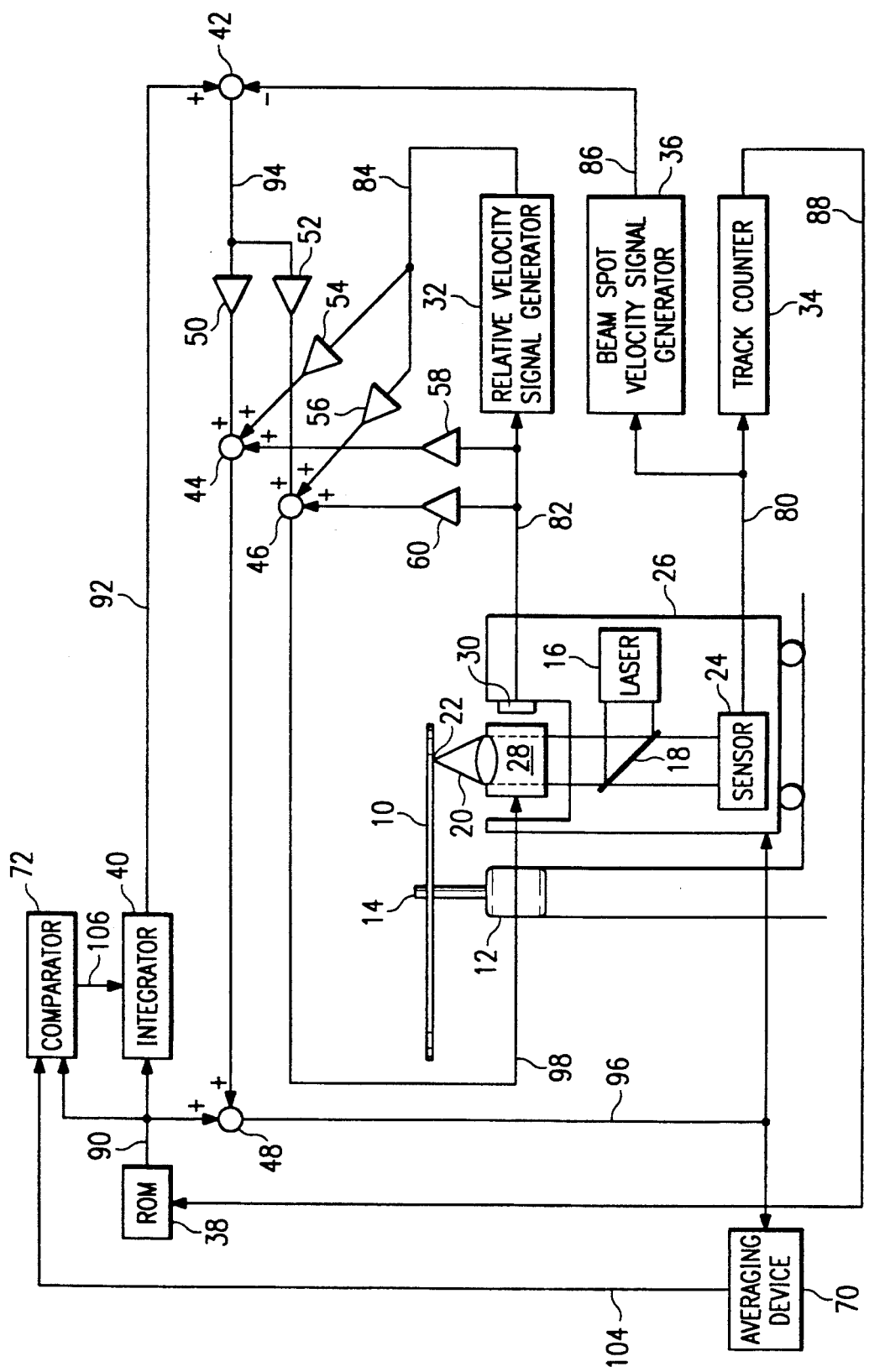
FIG. 3 is a block diagram showing a third embodiment of the present invention.

Next, a third embodiment of the present invention is explained with reference to FIG. 3. In general, to end a track access on a target track securely, the absolute value of acceleration of the coarse actuator at the time of deceleration is set to a value that is smaller than the nominal maximum acceleration. This margin is determined by taking into account the disturbance applied to the coarse actuator, the reduction of the drive force by the temperature dependency of the coarse actuator gain, variation among individual actuators in maximum acceleration, and other factors. For example, if the variation among individual coarse actuators in maximum acceleration is 5G±10% and the fluctuation according to temperature dependency is ±10%, the maximum acceleration of the actuator will be 4G (G stands for gravitational acceleration) in the worst case. Furthermore, if it is assumed that the disturbance is 0.5G, a reference velocity and other values must be set so that the acceleration will be 3.5G or less at maximum. Even if a certain individual actuator can have an acceleration of 6G at a certain point in time, the time required for track access will not be reduced, because control is performed at a reference velocity that is set to a low level. At present, therefore, the reference velocity and other values must be set so that the smaller the maximum acceleration can become, the longer the track access time is. In other words, in order to shorten the track access time, the variation in the gain of individual coarse actuators and the fluctuation according to temperature dependency have to be made small. This makes it difficult to design a coarse actuator.

Therefore, the third embodiment allows high-speed access, even if there is a fluctuation in the gain of coarse actuator 26, by adding averaging device 70 and comparator 72 to the first embodiment and by enabling the gain of integrator 40 to be varied by output signal 106 of comparator 72. More specifically, signal 96, which actually drives coarse actuator 26, is supplied to averaging device 70, and there small changes in drive signal 96 which are caused by the disturbance, the friction or resonance of coarse actuator 26, are removed by means of this signal. Averaging device 70 may be operated only during deceleration. To determine when this occurs, for example, changes in the sign of the output signal of ROM 38 are detected by a detector not shown in the figure, and averaging device 70 is activated by an output signal from the detector.

Output signal 104 of averaging device 70 is sent to comparator 72, where it is compared with reference drive signal 90. Comparator 72 outputs a binary signal 106 to integrator 40 as its gain control signal. If the averaged drive signal 104 is larger than reference drive signal 90, it means that the gain of coarse actuator 26 has become smaller than the gain of integrator 40. In this case, the gain of integrator 40 is reduced by output signal 106 of comparator 72. On the other hand, if the averaged drive signal 104 is smaller than reference drive signal 90, it means that the gain of coarse actuator 26 has become larger than the gain of integrator 40. In this case, the gain of integrator 40 is increased by output signal 106 of comparator 72.

Alternatively, in place of comparator 72, a divider may be used which outputs a signal to integrator 40 as its gain control signal indicating the quotient of the level of signal 90 divided by the level of signal 104.

When the gain of integrator 40 is changed according to the gain of coarse actuator 26, a trajectory (the reference velocity and the number of reference tracks) can be set automatically in such a way that each coarse actuator can exert its maximum acceleration. Even in cases when a trajectory to be set in advance must be given a sufficient margin because the fluctuation of the gain of coarse actuator 26 is strongly affected by the temperature dependency and gain variations of individual actuators, the trajectory is corrected and a fast access is achieved. On the other hand, since gain fluctuation is allowed in coarse actuator 26, the design becomes easy and the manufacturing cost can be reduced.

Figure 4:
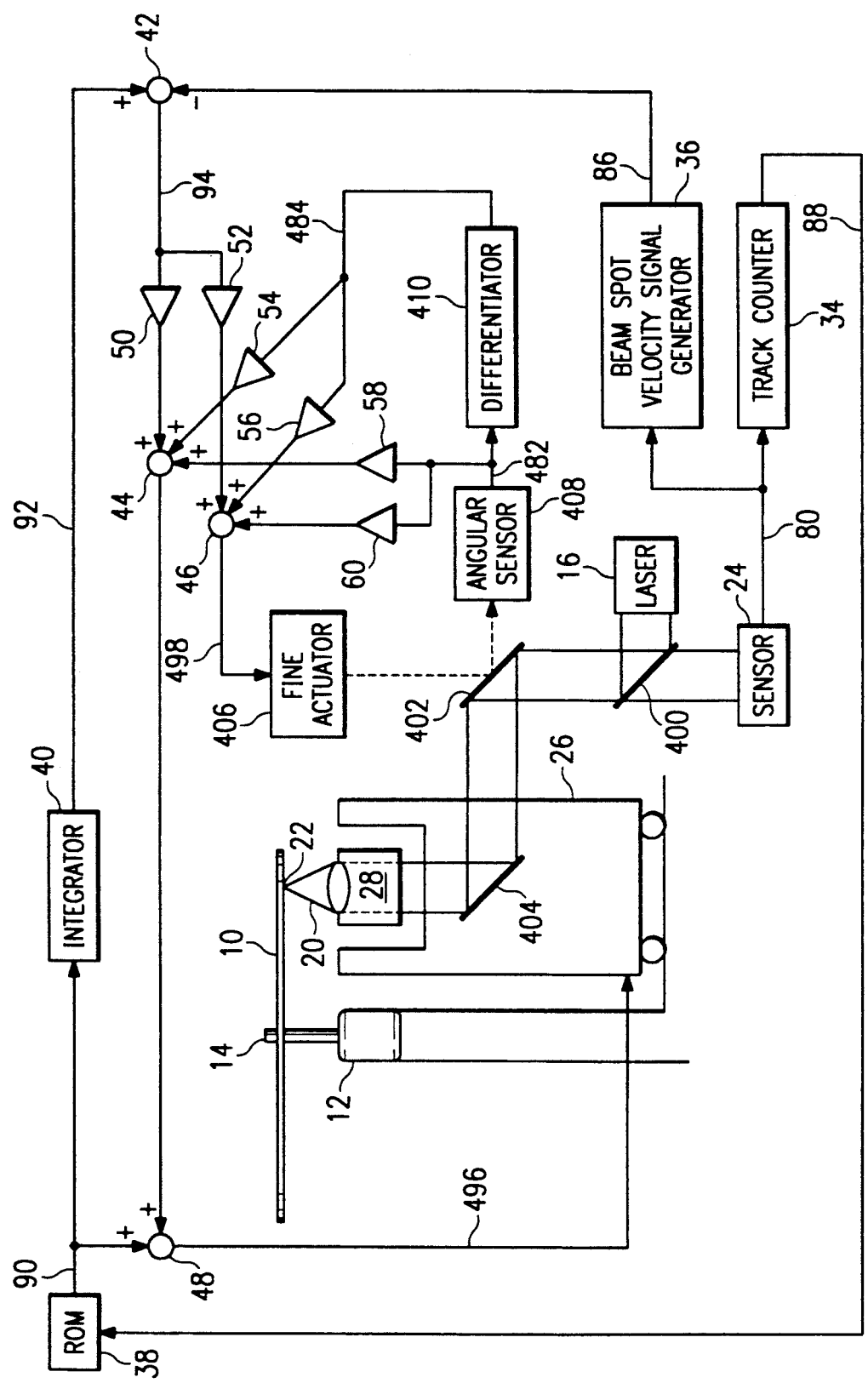
FIG. 4 is a block diagram showing a fourth embodiment of the present invention.

FIG. 4 schematically illustrates a fourth embodiment, in which the present invention is applied to an optical disk drive that is provided with a two-stage actuator in which a fine actuator moves a mirror, not an objective lens. The same reference numbers are given to the same components as in the first embodiment and their explanations are omitted, the components differing in the following respects.

In this embodiment, a laser beam outputted from laser-beam source 16 is reflected by a half-mirror 400 and mirrors 402 and 404 and is then focused by objective lens 20 as a beam spot 22 on the recording surface of optical disk 10. In addition, the beam reflected by the recording surface of optical disk 10 passes objective lens 20, mirrors 402 and 404, and half-mirror 400 and finally enters a sensor 24 to generate a TES 80. Objective lens 20 moves only in the focusing direction relative to coarse actuator 26, and not in the tracking direction.

Mirror 402 can be rotated around a shaft not shown in the figure. Fine actuator 406 rotates mirror 402 to control the fine positioning of optical spot 22. In this example, the displacement of mirror 402, which is caused by fine actuator 28, is the rotation angle of the mirror and is optically or electrically detected by an angular sensor 408. The output signal 482 of angular sensor 408 is converted into a signal 484 indicating the angular velocity of mirror 402 by a differentiator 410. Respectively and appropriately weighted signals 482, 484, and 94 are added together with reference drive signal 90 to generate drive signal 496 of coarse actuator 26. In addition, respectively and appropriately weighted signals 482, 484, and 94 are added together to generate drive signal 498 of fine actuator 406.

In this embodiment, instead of the relative position signal 82 and relative velocity signal 84 of the objective lens in the first embodiment, the corresponding angular signal 482 and angular velocity signal 484 are fed back to the two actuators 26 and 406. Therefore, accurate high-speed track access is achieved with the same mechanism as that of the first embodiment.

In the example shown in FIG. 4, mirror 402 is rotated by fine actuator 406, but the present invention functions properly even if the mirror is translated by a fine actuator.

In the described embodiments, the optical recording media are all optical disks, but the present invention can also be applied to accessing tracks of other optical recording media, such as optical cards.

As explained above, by using the present invention, maximum use can be made of the acceleration and deceleration capability of the coarse actuator, and a beam spot can be accurately directed to a target track at high speed. In addition, the velocity of a beam spot relative to the optical recording medium can be controlled with a simple hardware structure.

While the invention has been particularly shown and described with reference to the preferred embodiment thereof, it will be understood by those skilled in the art that various changes in form and details may be made therein without departing from the spirit and scope of the invention.

What is claimed is:

1. Apparatus for moving a beam spot for writing or reading information onto or from a target track of an optical recording medium having a plurality of tracks on a surface, the apparatus comprising:
   a coarse actuator for moving an objective lens over a plurality of tracks on said surface of said optical recording medium, said objective lens directing a beam spot onto said surface;

a fine actuator, carried by said coarse actuator, for moving said objective lens relative to said coarse actuator in a tracking direction;

means for calculating a distance from a current beam spot position on said surface to a target track;

means for generating a relative position signal indicating a displacement of said objective lens relative to said coarse actuator and a relative velocity signal indicating a velocity of said objective lens relative to said coarse actuator;

means for generating a beam spot velocity signal indicating a velocity of the beam spot relative to said optical recording medium;

means for generating a reference drive signal from the distance calculated by said distance calculating means, said reference drive signal being proportional to a reference acceleration of the beam spot relative to said optical recording medium;

means for generating a reference velocity signal from said reference drive signal indicating a reference velocity of the beam spot relative to said optical recording medium; and means for generating a velocity difference signal indicating a difference between said reference velocity and said the spot velocity;

wherein said coarse actuator is driven by a coarse actuator drive signal in accordance with said relative position and relative velocity signals of said objective lens, said velocity difference signal and said reference drive signal; and wherein said fine actuator is driven in accordance with said relative position and relative velocity signals of said objective lens and said velocity difference signal.

2. Apparatus for track access claimed in claim 1 wherein, said reference velocity generating means comprises means for generating the reference velocity signal having a same relationship to said reference drive signal as said beam spot velocity signal has to said coarse actuator drive signal.

3. Apparatus for track access claimed in claim 1 or claim 2, comprising:

means for calculating a reference distance to a target track from said reference velocity signal; and means for generating a distance difference signal indicating a difference between said reference distance and the distance calculated by said distance calculating means;

wherein said coarse actuator is driven by the coarse actuator drive signal in accordance with said distance difference signal, said relative position and velocity signals of said objective lens, said velocity difference signal and said reference drive signal; and wherein said fine actuator is driven in accordance with said distance difference signal, said relative position and velocity signals of said objective lens and said velocity difference signal.

4. Apparatus for track access claimed in claim 3, further comprising:

means for averaging the drive signal of said coarse actuator;

wherein a gain of said reference velocity generating means is controlled in accordance with said reference velocity generating signal and said reference drive signal.

5. Apparatus for moving a beam spot for writing or reading information onto or from a target track of an optical recording medium having a plurality of tracks on a surface, the apparatus comprising:

a coarse actuator for moving an objective lens over a plurality of tracks on said surface of said optical recording medium, said objective lens directing a beam spot onto said surface;

a fine actuator for moving a mirror to direct a beam from a light source to said objective lens;

means for calculating a distance from a current beam spot position on said surface to a target track;

means for generating a displacement signal, indicating a displacement of said mirror caused by said fine actuator, and a velocity signal, indicating a velocity of said mirror;

means for generating a beam spot velocity signal indicating a velocity of the beam spot relative to said optical recording medium;

means for generating a reference drive signal from the distance calculated by said distance calculating means, said reference drive signal being proportional to a reference acceleration of the beam spot relative to said optical recording medium;

means for generating a reference velocity signal from said reference drive signal indicating a reference velocity of the beam spot relative to said optical recording medium; and means for generating a velocity difference signal indicating a difference between said reference velocity and said beam spot velocity;

wherein said coarse actuator is driven in accordance with said displacement and velocity signals of said mirror, said velocity difference signal and said reference drive signal; and wherein said fine actuator is driven in accordance with said displacement and velocity signals of said mirror and said velocity difference signal.

6. An optical disk drive comprising:

means for supporting and rotating an optical disk having a plurality of tracks on a recording surface;

a light source;

an objective lens for directing a beam emitted from said light source onto said recording surface as a beam spot for writing or reading information;

a coarse actuator for moving said objective lens over a plurality of tracks on said surface;

a fine actuator, carried by said coarse actuator, for moving said objective lens relative to said coarse actuator in a tracking direction;

means for calculating a distance from a current beam spot position to a target track;

means for generating a relative position signal, indicating the displacement of said objective lens relative to said coarse actuator, and a relative velocity signal, indicating a velocity of said objective lens relative to said coarse actuator;

means for generating a beam spot velocity signal indicating a velocity of the beam spot relative to said disk;

means for generating a reference drive signal from the distance calculated by said distance calculating means, said reference drive signal being proportional to a reference acceleration of the beam spot relative to said optical disk;

means for generating a reference velocity signal from said reference drive signal indicating a reference velocity of the beam spot relative to said optical disk; and means for generating a velocity difference signal indicating a difference between said reference velocity and said beam spot velocity;

wherein said coarse actuator is driven in accordance with said relative position and velocity signals of said objective lens, said velocity difference signal and said reference drive signal; and wherein said fine actuator is driven in accordance with said relative position and velocity signals of said objective lens and said velocity difference signal.

7. An optical disk drive comprising:

means for supporting and rotating an optical disk having a plurality of tracks on a recording surface;

a light source;

a mirror for reflecting a beam emitted from said light source;

an objective lens for directing the beam reflected by said mirror onto said recording surface as a beam spot for writing or reading information;

a coarse actuator for moving said objective lens over a plurality of tracks on said surface;

a fine actuator for moving said mirror;

means for calculating a distance from a current beam spot position to a target track;

means for generating a displacement signal, indicating a displacement of said mirror caused by said fine actuator, and a velocity signal, indicating a velocity of said mirror;

means for generating a beam spot velocity signal indicating a velocity of the beam spot relative to said optical disk;

means for generating a reference drive signal from the distance calculated by said distance calculating means, said reference drive signal being proportional to a reference acceleration of the beam spot relative to said optical disk;

means for generating a reference velocity signal from said reference drive signal indicating a reference velocity of the beam spot relative to said optical disk; and means for generating a velocity difference signal indicating a difference between said reference velocity and said beam spot velocity;

wherein said coarse actuator is driven in accordance with said displacement and velocity signals of said mirror, said velocity difference signal and said reference drive signal; and wherein said fine actuator is driven in accordance with said displacement and velocity signals of said mirror and said velocity difference signal.

8. A method of controlling an actuator that moves a beam spot for writing or reading information onto or from a target track of an optical recording medium having a plurality of tracks on a recording surface, said actuator comprising:

a coarse actuator for moving an objective lens over a plurality of tracks and directing a beam spot onto said recording surface; and a fine actuator, carried by said coarse actuator, for moving said objective lens relative to said coarse actuator in a tracking direction; said method comprising the steps of:

calculating a distance from a current beam spot position to a target track;

generating a relative position signal, indicating a displacement of said objective lens relative to said coarse actuator, and a relative velocity signal, indicating a velocity of said objective lens relative to said coarse actuator;

generating a beam spot velocity signal indicating a velocity of the beam spot relative to said optical recording medium;

generating a reference drive signal from the distance calculated in said distance calculating step, said reference drive signal being proportional to a reference acceleration of the beam spot relative to said optical recording medium;

generating a reference velocity signal from said reference drive signal indicating a reference velocity of the beam spot relative to said optical recording medium;

generating a velocity difference signal indicating a difference between said reference velocity and said beam spot velocity;

driving said coarse actuator in accordance with said relative position and relative velocity signals of said objective lens, said velocity difference signal and said reference drive signal; and driving said fine actuator in accordance with said relative position and relative velocity signals of said objective lens and said velocity difference signal.

9. A method of controlling an actuator that moves a beam spot for writing or reading information onto or from a target track of an optical recording medium having a plurality of tracks on a recording surface, said actuator comprising:

a coarse actuator for moving an objective lens over a plurality of tracks and directing a beam spot onto said recording surface; and a fine actuator for moving a mirror used to direct a beam from a light source to said objective lens; said method comprising steps of:

calculating a distance from a current beam spot position to a target track;

generating a displacement signal, indicating a displacement of said mirror caused by said fine actuator, and a velocity signal, indicating a velocity of said mirror;

generating a beam spot velocity signal indicating a velocity of the beam spot relative to said objective recording medium;

generating a reference drive signal from the distance calculated in said distance calculating step, said reference drive signal being proportional to a reference acceleration of the beam spot relative to said optical recording medium;

generating a reference velocity signal from said reference drive signal indicating a reference velocity of the beam spot relative to said optical recording medium;

generating a velocity difference signal indicating a difference between said reference velocity and said beam spot velocity;

driving said coarse actuator in accordance with said displacement and velocity signals of said mirror, said velocity difference signal and said reference drive signal; and driving said fine actuator in accordance with said displacement and velocity signals of said mirror and said velocity difference signal.

* * * * *